United States Patent
Chang

(10) Patent No.: US 7,630,624 B2
(45) Date of Patent: Dec. 8, 2009

(54) DIGITAL CAMERA MODULE WITH FOCUSING FUNCTION

(75) Inventor: Jen-Tsorng Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 378 days.

(21) Appl. No.: 11/440,280

(22) Filed: May 24, 2006

(65) Prior Publication Data
US 2007/0077052 A1 Apr. 5, 2007

(30) Foreign Application Priority Data
Sep. 30, 2005 (CN) .................. 2005 1 0100079

(51) Int. Cl.
*G02B 7/04* (2006.01)
*G03B 13/34* (2006.01)

(52) U.S. Cl. .................. 396/144; 396/132; 396/133

(58) Field of Classification Search ............... 396/101, 396/89, 439, 452, 493, 497, 500, 144, 132–133; 235/439, 454; 348/E5.055, 231.6, 357, 345, 348/E5.045, E5.028, 240.99, 340, 335, 378–375, 348/E5.027, 72, 76, 77, 79–87, 103; 359/676, 359/822–824, 826; 250/234, 235, 208.1; 358/474, 497, 494, 486, 471, 483
See application file for complete search history.

(56) References Cited

U.S. PATENT DOCUMENTS
6,067,421 A * 5/2000 Kitazawa et al. ............ 396/133

* cited by examiner

*Primary Examiner*—Reena Aurora
(74) *Attorney, Agent, or Firm*—Steven M. Reiss

(57) ABSTRACT

A digital camera module (100) with a focusing function includes a holder, an image sensor package (30) and a wedge (60). The holder has several lens elements (16) received therein. The image sensor package is movably received in the holder. The wedge is inserted into the holder and resists the image sensor package so that when the wedge is pushed, the image sensor is caused to slide axially relative to the holder.

16 Claims, 1 Drawing Sheet

DIGITAL CAMERA MODULE WITH FOCUSING FUNCTION

TECHNICAL FIELD

The present invention relates generally to a camera module with a focusing function, and more particularly, to a small-sized digital camera module with a focusing function and to a portable electronic device, such as a mobile phone or a personal digital assistant (PDA), having such a camera module mounted therein.

BACKGROUND

With the development of wireless communication technologies, increasing numbers of mobile phones and PDAs now include digital cameras as a special feature.

Generally, digital cameras are image recording media capable of photographing a plurality of still images without using film. Such a digital camera typically uses an image pickup device, which is a kind of semiconductor device, such as a charge coupled device (CCD) or complementary metal oxide semiconductor (CMOS). In the digital camera, an object image formed on the image pickup device through a lens is converted into an electronic signal by the image pickup device, and the electrical signal is stored as a digital signal, for example, either in the camera unit or in a mobile phone or PDA in which the digital camera is mounted.

Since the digital camera is to be mounted in a small mobile phone or PDA, a fixed focus lens module is usually used to facilitate mounting thereof. However, images photographed by a digital camera module with a fixed focus lens module tend to be of poor quality. This is partly due to the fixed focus lens, which is incapable of adjusting distance between the lens and the image pickup device to make a clearer image when photographing objects at different distances from the camera.

A typical focusing structure has a focusing adjusting apparatus using a thread structure, which includes a lens module and a base. The base includes an image sensor. When adjusting focus, the lens module needs to be extensible or compressible relative to the base so that the distance between the lens module and the image sensor is changed. Therefore, a space above/over the lens module is required in order to provide the movement space. Furthermore, the lens module will rotate relative to the base at work. This structure causes eccentricity problems so as to effect the image quality.

Therefore, a digital camera with a focusing function is desired in order to overcome the above-described shortcomings.

SUMMARY

In one embodiment thereof, a digital camera module with a focusing function includes a holder, an image sensor package and a wedge. The holder has at least one lens element received therein. The image sensor package is movably received in the holder. The wedge is inserted into the holder and resists the image sensor package so that when the wedge is pushed, the image sensor is caused to slide axially relative to the holder.

Other advantages and novel features will become more apparent from the following detailed description when taken in conjunction with the accompanying drawings.

BRIEF DESCRIPTION OF THE DRAWING

Many aspects of the digital camera module with the focusing function can be better understood with reference to the following drawing. The components in the drawing are not necessarily drawn to scale, the emphasis instead being placed upon clearly illustrating the principles of the digital camera module with the focusing function. Moreover, in the drawings, like reference numerals designate corresponding parts throughout the several views.

DETAILED DESCRIPTION OF THE EMBODIMENTS

Figure 1:
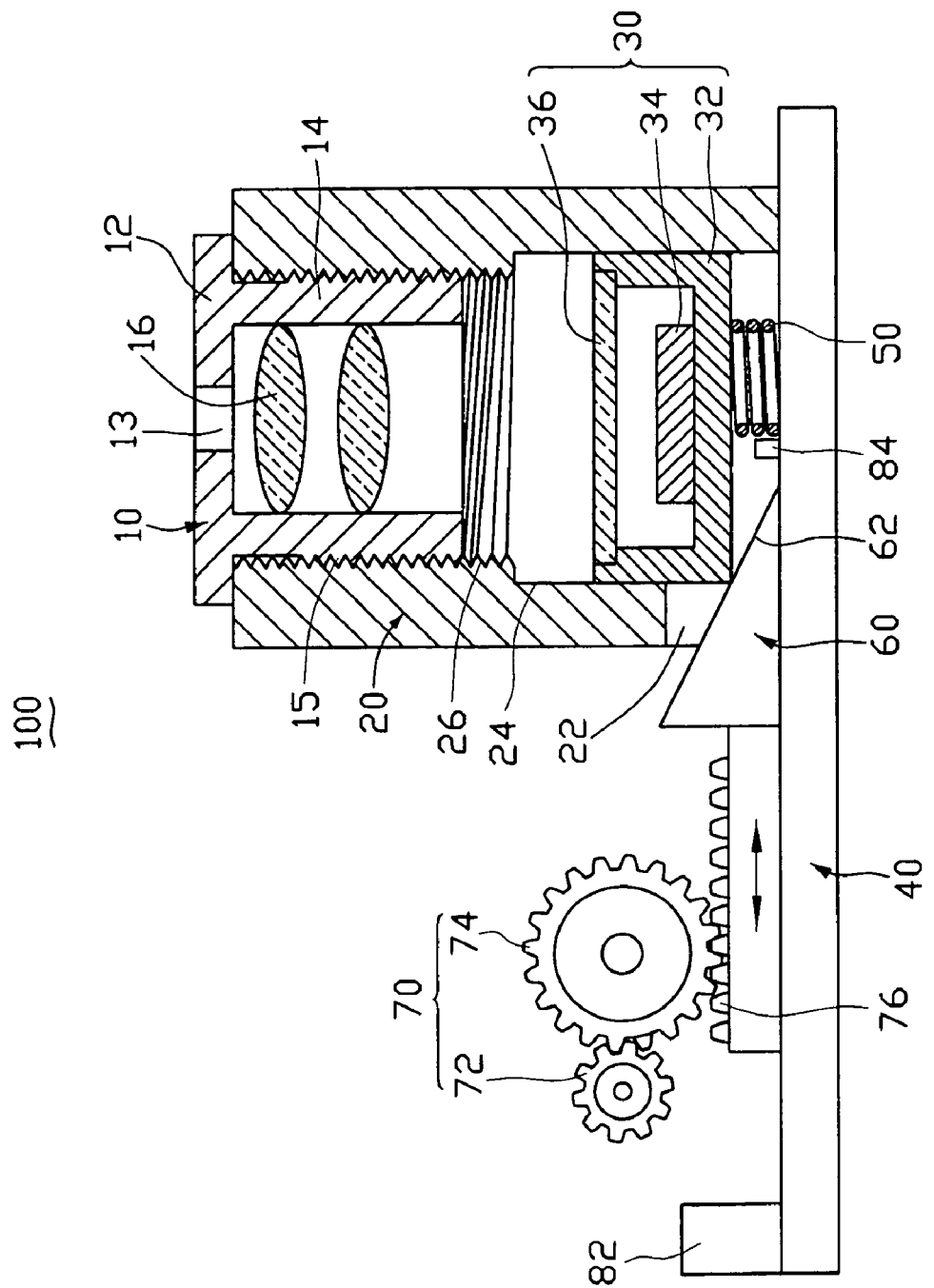
FIG. 1 is a cut-away view of an embodiment of a digital camera module with a focusing function.

Referring now to the drawings, FIG. 1 shows a digital camera module 100 with a focusing function, according to an exemplary embodiment. The digital camera module 100 is adapted for use in a portable electronic device such as a mobile phone or a Personal Digital Assistant (PDA), but the compact nature thereof could prove useful in compact digital camera units, digital camcorders or regular film cameras as well. The digital camera module 100 includes a barrel 10, a sleeve 20, an image sensor package 30, a base board 40, a return spring 50, a wedge 60, a driving mechanism 70 and a limiting structure 80.

The barrel 10 includes a flange 12 and a barrel body 14 formed together. The flange 12 is formed at a top end of the barrel body 14. The flange 12 has a through hole 13 defined in a middle thereof The barrel body 14 is a hollow cylinder, and the through hole 13 communicates with the barrel body 14 so that light beams can be transmitted therethrough. The barrel body defines an outer thread 15 at an outer periphery wall thereof. Several lens elements 16 are disposed in the barrel body 14, and receive light beams that enter from the outside.

The sleeve 20 is a substantially hollow cylinder with two open ends so that light beams can be transmitted therethrough. One open end of the sleeve 20 receives the barrel 10, the opposite end of the sleeve 20 defines a cutout 22 at one sidewall thereof. An axis of the sleeve 20 aligns with a center of the image sensor package 30 such that the sleeve 20 is capable of routing the input light beams. The sleeve 20 has an inner periphery wall 24 thereof and a thread wall 26 connected with each other. A diameter of the inner periphery wall 24 is larger than a diameter of the thread wall 26. The outer thread 15 of the barrel body 14 engages with the thread wall 26 of the sleeve 20 so that the barrel 10 may be received in the sleeve 20 and mounted relative to the sleeve 20 by means of thread structure.

The image sensor package 30 is received in one open end of the sleeve 20 opposite to the barrel 10, and may slide relative to the sleeve 20. The image sensor package 30 includes a carrier 32, an image sensor chip 34 and a cover 36. The carrier 32 is a hollow cylinder with an open end and a closed end, and is formed by plastic. The image sensor chip 34 is received in the carrier 32, and is adhered to the bottom of the carrier 32 via an adhesive means. The image sensor chip 34 can be a charge-coupled device (CCD) or a complementary metal-oxide semiconductor (CMOS). The cover 36 is transparent and is laid over the image sensor chip 34 which receives light transmitted through the cover 36. The cover 36 is adhered on the carrier 32 by adhesive means and therefore seals the image sensor chip 34 in the carrier 32. The image sensor chip 34 may convert the optical image data of an object into electronic signals. The image sensor chip 34 is sealed in a package so as to protect the image sensor chip 34 from contamination or pollution (i.e. from dust or water vapor).

The base board 40 is mounted under the sleeve 20 for supporting the sleeve 20. One end of the return spring 50 is mounted on a bottom of the image sensor package 30, the opposite end of the return spring 50 is fixed on the base board 40. The return spring 50 is in a stretched state, and always has a tendency of drawing the image sensor package 30 toward the base board 40. The wedge 60 is disposed on the base board 40, and is received in the cutout 22 of the sleeve 20. The wedge 60 includes a slope 62, which resists the image sensor package 30. The wedge 60 may move horizontally, and the image sensor package 30 may move vertically along the axis of the barrel 10 under the role of the wedge 60.

The driving mechanism 70 is disposed on the base board 40, and is located at one side of the wedge 60. The driving mechanism 70 includes a step motor 72, a gear 74 and a rack 76. The rack 76 may slide on the base board 40. The step motor 72 may drive the gear 74 to rotate relative to the step motor 72. The gear 74 may further drive the rack 76 to move horizontally. The rack 76 pushes the wedge 60 to move so that the distance between the image sensor package 30 and the barrel 10 may be automatically adjusted.

The limiting structure 80 includes a first stopper 82 and a second stopper 84. The first stopper 82 is mounted on the base board 40, and is spaced from the rack 76. The first stopper 82 may limit the displacement of the rack 7 so as to avoid the rack 76 exceeding the predetermined range. The second stopper 84 is disposed between the wedge 60 and the return spring 50. The second stopper 84 is substantially a short cylinder, and may limit the movement range of the wedge 60.

In assembly, one end of the return spring 50 is mounted on the base board 40, the other end of the return spring 50 is fixed on the image sensor package 30. Then, the barrel 10 is inserted into the sleeve 20 from one end thereof, with the flange 12 located outside the sleeve 20. One end of the sleeve 20 opposite to the barrel 10 is fixed on the base board 40 by means of adhesion and/or welding, and surrounds the image sensor package 30. The image sensor chip 34 aligns with the axis of the barrel 10. After that, the wedge 60 is inserted into the cutout 22 of the sleeve 20. The rack 76 is situated adjacent to the wedge 60. The gear 74 is located on the rack 76 and meshes each other. Finally, the gear 74 is also connected with the step motor 72.

In use, the digital camera module 100 is fitted within a portable electronic device, such as a mobile phone, and the image sensor is electrically connected with a circuit board of the mobile phone for receiving power. When taking pictures, the light reflected from an image object (not shown) pass through the lens elements. The lens elements focus the light, after which the light arrives at the image sensor chip 34. The image sensor chip 34 transforms the light signal into an electronic signal, permitting the storage of the image information in a memory of the digital camera. As such, the photographic process is finished. If the image should prove not to be clear enough (i.e. out of focus), the user may move the rack 76 by hand forward or backward. The rack 76 further enables the wedge 60 to move horizontally. The wedge 60 causes the image sensor package 30 to slide axially relative to the sleeve 20 up and down. Accordingly, the distance between the barrel 10 and the image sensor chip 34 is changed, thereby resulting in the stable telescopic movement of the barrel 10. The image distance is changed so that a distant object can be imaged in the image sensor. When the image becomes clear, the image sensor package 30 stops sliding. The barrel 10 is kept in the focusing position because of the limitation influence of the rack 76. Thus, the focusing purpose is achieved by changing the distance between the image sensor 34 and the barrel 10. If accurate control is needed, the step motor 72 may be activated. The step motor 72 further drives the gear 74 to rotate so as to cause the rack 76 to move. In this way, the image sensor package 30 can be precisely controlled to move to the required position. The return spring 50 helps the image sensor package 30 to move downwards so as to avoid the image sensor package 30 becoming stuck in the sleeve 20. The first stopper 82 and the second stopper 84 may limit the displacement range of the rack 76 and the wedge 60.

A main advantage of the digital camera module 100 with a focusing function is that the wedge 60 drives the telescopic movement of the image sensor package 30. The focusing operation of the digital camera module 100 is simple. In addition, the digital camera module 100 may be conveniently operated by manual or mechanical means.

In alternative embodiments, two wedges 60 may be located at two sides of the sleeve 20 so as to provide the uniform forces to drive the image sensor package 30 to slide axially. The wedge may be replaced with a resisting element with a slope so as to change the distance between the image sensor package and the sleeve.

In a still further alternative embodiment, the driving mechanism 70 may be an piezoelectric element. The piezoelectric material may lengthen or shorten under the influence of an electric field. The wedge 60 may be driven by the piezoelectricity element so as to change the distance between the image sensor package 30 and the barrel 10.

In a still further alternative embodiment, the driving mechanism 70 may be omitted, and the wedge 60 can be directly pushed by hand. The barrel 10 and the sleeve 20 together may be acted as a holder to receive the image sensor package. Understandably, the sleeve 20 may be omitted, and the holder only has a barrel with directly mounted on the base board 40. Alternatively, the barrel 10 may be omitted, the holder only has a sleeve. The lens elements are disposed in the sleeve, and the sleeve is mounted on the base board.

As described above, the preferred embodiment provides a digital camera module 100 with a focusing function for devices such as mobile phones, which has both simplicity and ease of use. It is, however, to be understood that the digital camera module 100 could potentially be useful in other applications in which it may be desirable to allow incoming light to be adjusted so as to attain a clear image.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A digital camera module, comprising:
   a holder having at least one lens element received therein;
   an image sensor package received in the holder and movable along an optical axis; and
   a wedge, the wedge inserted into the holder in a direction substantially perpendicular to the optical axis and abutting the image sensor package so that when the wedge is moved, the image sensor package is caused to slide along the optical axis and relative to the holder.

2. The digital camera module as claimed in claim 1, wherein the holder defines a cutout at a peripheral wall thereof, the wedge is slidably received in the cutout, and the image sensor package slides along the wedge relative to the holder.

3. The digital camera module as claimed in claim 1, further comprising a base board, the holder is mounted on the base board, and the wedge slides on the base board.

4. The digital camera module as claimed in claim 1, wherein the holder includes a barrel and a sleeve, the barrel receives the at least one lens element, and the sleeve is fixed on the base board.

5. The digital camera module as claimed in claim 1, further comprising a driving mechanism for driving the wedge to move, and the driving mechanism is disposed at one side of the wedge opposite to the holder.

6. The digital camera module as claimed in claim 5, wherein the driving mechanism includes a gear and a rack, the rack resists the wedge, and the gear meshes with the rack to drive the wedge to move.

7. The digital camera module as claimed in claim 6, wherein the driving mechanism further comprises a step motor, and the step motor drives the gear to rotate.

8. The digital camera module as claimed in claim 3, further comprising a return spring, one end of the return spring is fixed on the base board, the opposite end of the return spring is fixed under the image sensor package, and the return spring draws the image sensor package toward the base board.

9. The digital camera module as claimed in claim 3, wherein a stopper is positioned on the base board and disposed between the return spring and the wedge so as to limit the displacement range of the wedge.

10. A digital camera module, comprising:
  a holder and an image sensor apparatus, one of the holder and the image sensor apparatus being fixed relative to a base, the holder and the image sensor apparatus being slidably connected with each other; and
  a wedge, the wedge inserted into and resisting one of the holder and the image sensor apparatus sliding on the base so as to cause one of the holder or the image sensor apparatus to slide relative to the other.

11. The digital camera module as claimed in claim 10, wherein the holder is attached to the base.

12. The digital camera module as claimed in claim 11, wherein the holder includes a barrel and a sleeve threadedly connected to each other, the sleeve defines a cutout at a peripheral wall thereof, and the wedge is slidably received in the cutout, and the image sensor package axially slides along the wedge relative to the barrel.

13. The digital camera module as claimed in claim 10, further comprising a driving mechanism for driving the wedge to move, and the driving mechanism is disposed at one side of the wedge opposite to the holder.

14. The digital camera module as claimed in claim 13, wherein the driving mechanism includes a gear and a rack, the rack resists the wedge, and the gear meshes with the rack to drive the wedge to move.

15. The digital camera module as claimed in claim 14, wherein the driving mechanism further comprises a step motor, the step motor drives the gear to rotate.

16. The digital camera module as claimed in claim 14, further comprising a limiting structure, the limiting structure includes a first stopper and a second stopper, the first stopper and the second stopper are fixed on the base, the first stopper is disposed at one side of the rack opposite to the holder so as to limit the displacement range of the rack, and the second stopper is disposed at one side of the wedge opposite to the rack so as to limit the displacement range of the rack.

\* \* \* \* \*

UNITED STATES PATENT AND TRADEMARK OFFICE
CERTIFICATE OF CORRECTION

PATENT NO. : 7,630,624 B2  Page 1 of 1
APPLICATION NO. : 11/440280
DATED : December 8, 2009
INVENTOR(S) : Jen-Tsorng Chang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 576 days.

Signed and Sealed this

Second Day of November, 2010

David J. Kappos
*Director of the United States Patent and Trademark Office*